(12) United States Patent
Saillet et al.

(10) Patent No.: US 11,429,878 B2
(45) Date of Patent: Aug. 30, 2022

(54) COGNITIVE RECOMMENDATIONS FOR DATA PREPARATION

(71) Applicant: INTERNATIONAL BUSINESS MACHINES CORPORATION, Armonk, NY (US)

(72) Inventors: Yannick Saillet, Stuttgart (DE); Martin A. Oberhofer, Pondorf (DE); Jens P. Seifert, Gaertringen (DE)

(73) Assignee: International Business Machines Corporation, Armonk, NY (US)

( * ) Notice: Subject to any disclaimer, the term of this patent is extended or adjusted under 35 U.S.C. 154(b) by 957 days.

(21) Appl. No.: 15/712,691

(22) Filed: Sep. 22, 2017

(65) Prior Publication Data
US 2019/0095801 A1 Mar. 28, 2019

(51) Int. Cl.
*G06N 5/04* (2006.01)
*G06N 20/00* (2019.01)
*G06N 5/00* (2006.01)
*G06F 16/215* (2019.01)

(52) U.S. Cl.
CPC ............. *G06N 5/04* (2013.01); *G06N 5/00* (2013.01); *G06N 20/00* (2019.01); *G06F 16/215* (2019.01)

(58) Field of Classification Search
CPC . G06N 5/04; G06N 20/00; G06N 5/00; G06F 16/215
See application file for complete search history.

(56) References Cited

U.S. PATENT DOCUMENTS

| 8,209,271 | B1 | 6/2012 | Lin et al. |
| 9,082,076 | B2 | 7/2015 | Miranda et al. |
| 2014/0279972 | A1 | 9/2014 | Sing et al. |
| 2014/0372346 | A1* | 12/2014 | Phillipps ............... G06N 20/00 706/12 |
| 2016/0253340 | A1 | 9/2016 | Barth et al. |
| 2016/0371395 | A1* | 12/2016 | Dumant ............ G06F 16/24575 |
| 2018/0285772 | A1* | 10/2018 | Gopalan ............... G06N 7/005 |

OTHER PUBLICATIONS

Abdul Kaleem, "Address Standardization using Supervised Machine Learning", IEEE, 2011 (Year: 2011).*
Antonio, Tallon_Ballesteros, "Data Cleansing Meets Feature Selection: A Supervised Machine Learning Approach", 2015 (Year: 2015).*

(Continued)

*Primary Examiner* — Ann J Lo
*Assistant Examiner* — Van C Mang
(74) *Attorney, Agent, or Firm* — David Spalding

(57) ABSTRACT

A method, computer system, and computer program product for providing recommendations about processing datasets. A set of machine learning models are provided for use in respectively determining data processing action performable on a dataset based on a respective set of features of the dataset. A current dataset is received. A set of features of the current dataset are determined. One or more data processing actions are generated to be executed on the current dataset, which are determined by at least two machine learning models of the provided set, based on the determined set of features of the current dataset. One or more of the data processing actions are performed on the current dataset.

17 Claims, 3 Drawing Sheets

(56) References Cited

OTHER PUBLICATIONS

Stodder, "Improving Data Preparation for Business Analytics", Best Practices Report, TDWI, Q3 2016, 42 Pages, Copyright 2016 TDWI, Renton, WA.

Brownlee, "How to Prepare Data For Machine Learning", Machine Learning Mastery, Dec. 25, 2013, 13 Pages, Copyright 2017 Machine Learning Mastery, https://machinelearningmastery.com/how-to-prepare-data-for-machine-learning/machine.

* cited by examiner

COGNITIVE RECOMMENDATIONS FOR DATA PREPARATION

BACKGROUND

The present invention relates generally to the field of digital computer systems, and more particularly to methods for processing and preparation of datasets.

Data quality improvement is typically achieved by way of data cleansing, which can include four stages: investigation, standardization, de-duplication, and survivorship. In the standardization stage, data is transformed to a standard, uniform format. The standardization stage can include segmenting the data, canonicalization, correcting spelling errors, and enrichment, among other data cleansing tasks that use rule sets. Generally, data of different domains require different rule sets for processing. The task of determining an appropriate data processing action to be performed can be time consuming, and is prone to error because it can be erroneously based on personal user experience.

SUMMARY

Various embodiments provide a method providing recommendations about processing datasets, computer system and computer program product as described by the subject matter of the independent claims. Advantageous embodiments are described in the dependent claims. Embodiments of the present invention can be freely combined with each other if they are not mutually exclusive.

Aspects of the present invention are directed to a method, system, and computer program product.

According to an aspect of the present invention, a method is provided for providing recommendations about processing datasets, where each dataset includes one or more records containing a respective set of data fields. The method may include providing a set of machine learning models, each being usable to determine a data processing action performable on a dataset based on a respective set of features of the dataset. A current dataset is received. A set of features of the current dataset are determined. One or more data processing actions are generated to be executed on the current dataset, which are determined by at least two machine learning models of the provided set, based on the determined set of features of the current dataset. One or more of the data processing actions are performed on the current dataset.

According to an aspect of the present invention, a computer system is provided. The computer system may include one or more computer processors, one or more computer-readable storage media, and program instructions stored on one or more of the computer-readable storage media for execution by at least one of the one or more computer processors. The program instructions may be executed to perform the disclosed method.

According to an aspect of the present invention, a computer program product is provided. The computer program product may include one or more computer-readable storage devices and program instructions stored on at least one of the one or more computer-readable storage devices for execution by at least one or more computer processors of a computer system. The program instructions may be executed by the at least one or more computer processors of the computer system to perform the disclosed method.

BRIEF DESCRIPTION OF THE DRAWINGS

In the following embodiments of the invention are explained in greater detail, by way of example only, making reference to the drawings in which.

DETAILED DESCRIPTION

Figure 1:
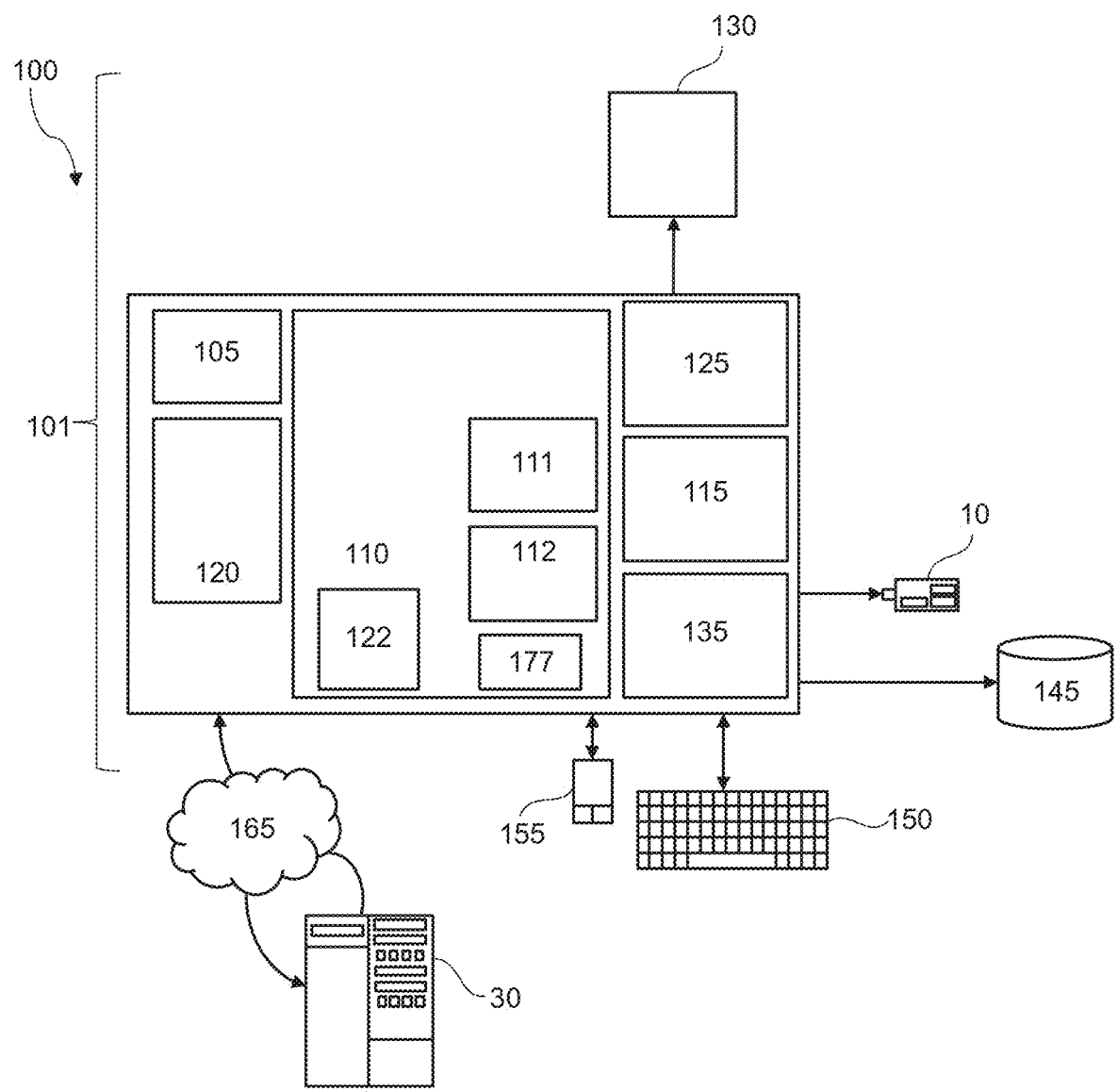
FIG. 1 is a block diagram depicting a generalized computer system, in accordance with an embodiment of the present invention.

The descriptions of the various embodiments of the present invention will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, the technical improvements over conventional technologies, or to enable others of ordinary skill in the art to understand and practice the embodiments disclosed herein.

Embodiments of the present invention enable the application of machine learning in performing data preparation and/or cleansing tasks, based on and by way of machine learning of received input training data including data representing past tasks or actions performed on the input training data, such as by users, to determine, generate, and provide data preparation and/or cleansing steps performable on the training data, as well as on other, similar training data. A reaction by the users to the provided data preparation and/or cleansing steps may be observed, for use in updating the input training data, accordingly. The past tasks or actions performed on the input training data may include those that were performed by users such as curators, subject matter experts, or the like. The data preparation and/or cleansing tasks may otherwise be referred to as data processing actions, tasks, instructions, or the like. A data preparation and/or cleansing step to perform may be suggested to a user, and a reaction by the user to the suggestion may be observed for use in refinement of future suggestions. Where a new dataset requires registration or storage, data profiling, data classification, and data quality analyses may automatically be performed with respect to fields (i.e., data fields) of the new dataset and the new dataset as a whole, to determine and collect corresponding data and information representative of various related metrics and properties thereof, and to generate corresponding input features for use in predicting and suggesting required data preparation and/or cleansing steps to be performed on the new dataset. The determined and collected data and information relating to the various metrics and properties may be used to score the dataset against a collection of data mining predictive models trained at a dataset level, as well as at a dataset data field level. A particular or final data preparation and/or cleansing step to be performed may be selected for suggestion from amongst a number of determined or candidate data processing actions that may be performed, based on the results obtained by way of the data mining predictive models. In an example, the reaction of the user to the suggestion may be monitored by observing, logging, and storing data and information representative of details associated with actual data preparation steps performed, for analysis with respect to corresponding suggested data preparation steps. In the example, the data and information representative of the details may be stored in a database in association with corresponding dataset metrics and properties, with respect to actual data preparation steps performed. The data and information stored in the database may be used to retrain the data mining predictive models at, for example, regular intervals, to allow for the machine and system learning system to learn from human actions with respect to data preparation and/or cleansing steps performed, in relation to corresponding types of datasets.

As used herein, "machine learning" refers to a process of using a computer algorithm to extract useful information from training data in an automated way, such as by building probabilistic models (referred to as machine learning models). Machine learning may be performed using one or more learning algorithms, such as those using linear regression, K-means, etc.

As used herein, a "model" may be or include an equation or set of rules used in determining an output value such as an unmeasured value, based on known values, for use in predicting corresponding data processing actions to be applied. For example, a model can be used to predict that standardization of data is a data processing action that can be performed (e.g., with 60% confidence) on a given dataset, based on input features comprising data profiling results and field names of the dataset.

As used herein, "dataset" refers to a collection of data, such as in the form of a data table, database, a list, or the like. The collection of data may be formatted so as to enable extraction of sets of input features therefrom, for input to a set of machine learning models. For example, a particular collection of data corresponding to a dataset may be formatted in tabular form, where each column may represent a particular variable or attribute, and each row may represent a given member, record, or entry, with respect to the dataset. The collection of data may be formatted into various forms, such as in JSON format, No-sql database format, XML format, etc.

According to an embodiment, each machine learning model of a set of machine learning models may be configured to associate a score with each determined data processing action, the score being indicative of a relevance of a corresponding data processing action. Efficient processing of datasets may thereby be enabled by only processing actions having scores indicative of particular relevance, such as by exceeding a predetermined threshold value, to avoid unnecessary usage of processing resources.

According to an embodiment, a score associated with a determined data processing action may be, for example, indicative of a level of confidence of the determination of the respective action and a level of confidence of the respective machine learning model that made the determination. For example, a level of confidence may be used as a measure of a relatively likelihood that an action B may be processed where an input A may be received. The level of confidence may be expressed as a percentage.

According to an embodiment, provisioning data processing actions may comprise, for example, selecting a set of suitable or final data processing actions from amongst determined data processing actions for execution on a current dataset, based on corresponding scores thereof. For example, the selecting of the set of final actions may be performed by comparing corresponding scores thereof to respective predetermined threshold values. Efficient processing of datasets may thereby be enabled, as waste of processing resources used in processing low scored actions may be prevented.

According to an embodiment, provisioning data processing actions may comprise, for example, presenting, displaying, or otherwise providing determined data processing actions to a user. Presenting the data processing actions may comprise, for example, prompting the user to select a data processing action to execute, from among the presented data processing actions.

According to an embodiment, a method for providing recommendations about processing datasets may comprise, for example, receiving one or more user-selections of presented data processing actions, for execution on a current dataset. Efficient processing of datasets may thereby be enabled, as a greater level of control over processing of the dataset may be provided, which may prevent waste of processing resources that may otherwise be used in processing low scored actions.

According to an embodiment, a method for providing recommendations about processing datasets may comprise, for example, executing determined data processing actions on a current dataset. Where an action may be suggested, recommended, or otherwise output by more than one machine learning model, the action may be executed only once. Efficient processing of datasets may thereby be enabled, as processing resources that would otherwise be required by an intermediate action selection step, action filtering step, or the like, may be avoided.

According to an embodiment, a method for providing recommendations about processing datasets may comprise, for example, determining or identifying executed data processing actions performed on a current dataset; feeding information regarding a user's actions with respect to the current dataset to training sets for application in machine learning models; and retraining the machine learning models using the training sets.

According to an embodiment, a method for providing recommendations about processing datasets may comprise, for example, determining current features of a current dataset, for use as input features to machine learning models, respectively, using one or more data profiling algorithms, data classification algorithms, and/or data quality algorithms. This may enable data processing actions by way of machine learning models such as classification models.

According to an embodiment, a method for providing recommendations about processing datasets may comprise, for example, determining a quality metric with respect to a processed dataset, processed by way of corresponding executed data processing actions, and retraining machine learning models in accordance with the determined quality metric upon completion of processing of the dataset. This may enable enhanced performance of the machine learning models by allowing for increased predictability thereof.

According to an embodiment, a set of machine learning models may comprise, for example, an association model, a classification model, and a text classification model.

According to an embodiment, selecting an action to execute from amongst determined data processing actions may comprise, for example, use of a classification function. The classification function may be used to, for example, average or sum scores associated with corresponding machine learning models.

Advantageously, the recommended data processing actions according to the present disclosure provide an efficient and accurate technique for use in preparing datasets such as training datasets, compared with conventional techniques. The prepared training datasets may be applied in effectively training natural language processing (NLP) systems, for use by users. To that end, embodiments of the present invention have the capacity to improve the technical field of cognitive computing, by enabling more efficient functionality, operation, and utilization of machine learning models and algorithms in enabling NLP systems to provide relevant results in response to submitted queries, and the like. Further, the NLP-centric issue of effectively and efficiently preparing training data for use in training NLP systems is solved by the present invention, as a system is provided for systematically preparing the training data accurately and precisely, with respect to semantics, context, and the like.

FIG. 1 is a block diagram depicting a generalized computer system, in accordance with an embodiment of the present invention.

It will be appreciated that methods described herein are at least partly or partially non-interactive, and may be automated by way of computerized systems such as servers or embedded systems, in accordance with embodiments of the present invention. In an exemplary embodiment, the methods described herein may be implemented in a (partly) interactive system. The methods may be implemented in software 112 which may include firmware 122, in hardware including processor 105, or a combination thereof. In an exemplary embodiment, the methods may be implemented, for example, in software such as in the form of an executable program, and may be executed by a special or general-purpose digital computer, such as a personal computer, workstation, minicomputer, microcomputer, mainframe computer, or the like. System 100 may include a general- or special-purpose computer, such as computer 101.

In an exemplary embodiment, computer 101 may include, for example, processor 105 and memory 110, each communicatively coupled to memory controller 115, and input/output devices such as input/output device 10 and/or input/output device 145, which may be communicatively coupled via input/output controller 135. Input/output controller 135 may include, for example, a bus or other wired or wireless connection, as known in the art. The input/output controller 135 may otherwise or additionally include, for example, other elements to enable communications, such as buffers or caches, drivers, repeaters, transceivers, and the like, which are omitted herein for the sake of simplicity. Further, the local interface may include address, control, and/or data connections to enable appropriate communications among the aforementioned components. As described herein, input/output devices 10 or 145 may respectively include, for example, any type of cryptographic card, smart card, or the like, as known in the art.

Processor 105 may be a hardware device for executing software, such as software 112 stored in memory 110. Processor 105 may be, for example, a central processing unit (CPU), an auxiliary processor, a semiconductor based microprocessor such as in the form of a microchip or chip set, a microprocessor, or the like. Processor 105 may otherwise be any device capable of reading and executing software instructions.

Memory 110 may include one or more volatile memory elements, such as in the form of random-access memory (RAM), dynamic random-access memory (DRAM), static random-access memory (SRAM), synchronous dynamic random-access memory (SDRAM), or the like. Memory 110 may additionally or alternatively include one or more non-volatile memory elements, such as in the form of read-only memory (ROM), erasable programmable read-only memory (EPROM), electronically erasable programmable read-only memory (EEPROM), programmable read-only memory (PROM), or the like. Memory 110 may be of a distributed architecture including various distributed components accessible by processor 105. The components of the distributed architecture may be, for example, situated remotely.

Software such as software 112 in memory 110 may include, for example, an operating system (OS) such as OS 111. Software 112 may further include, for example, one or more separate software programs, each comprising an ordered listing of executable instructions for implementing logical functions. In an example, software 112 may be or include a source program, an executable program such as in the form of object code, script, a set of instructions, an application programming interface, or the like. In the example, where software 112 includes a source program, an appropriate compiler, assembler, interpreter, or the like, may be required for translation and proper operation in connection with OS 111. The executable instructions may include, for example, instructions to manage databases such as in the form of database management systems, or the like. Memory 110 may further include, for example, a query optimizer. The query optimizer may include instructions such as software instructions that, when executed, may provide a query execution plan for use in executing a given query. Software such as software 122 in memory 110 may further include, for example, a basic input output system (BIOS).

Input devices such as keyboard 150 and mouse 155 may be coupled to input/output controller 135, as depicted in FIG. 1. Output devices such as input/output devices 10 or 145 may respectively include, for example, a printer, scanner, microphone, or the like. In various embodiments, system 100 may include, for example, a network interface for coupling to a network such as network 165. Input/output devices 10 or 145 may respectively include, for example, a network interface card (NIC), a modulator/demodulator (for accessing other files, devices, systems, or a network), a transceiver such as a radio frequency (RF) transceiver, a telephonic interface, a bridge, a router, or the like, in addition to the aforementioned. System 100 may include a display controller 125 coupled to a display 130. Network 165 may be an IP-based network that may be used for communications between computer 101 and an external or remotely located server, client, or the like, such as external system 30. For example, computer 101 and external system 30 may be used in conjunction to perform methods as described herein by way of network 165. Network 165 may be implemented wirelessly using protocols and technologies such as WiFi, WiMax, or the like. Network 165 may additionally or otherwise be implemented using wired or fiber optic connections. Network 165 may be an intranet, a packet-switched network such as a local area network (LAN), a wide area network (WAN) such as the Internet, a personal area network (PAN), a virtual private network (VPN), or the like.

Generally, processor 105 executes software 112 stored in memory 110 during operation of computer 101 in performing methods as described herein. The methods as described herein may otherwise be stored on any type of computer readable storage medium, such as storage 120, for execution and use by a computer system such as computer 101, in accordance with embodiments of the present invention. Storage 120 may include, for example, a disk storage such as an HDD storage, or the like.

Software such as software 112 may include a machine learning application such as machine learning application 177, executable to implement a set of machine learning models in accordance with embodiments of the present invention. Each machine learning model may respectively receive input data (e.g., an input dataset) relating to a set of features of a dataset, to determine for output one or more data processing actions performable on the dataset. The data processing actions may be determined by each of the machine learning models based on the respectively received input data. Determining the data processing actions may include predictively selecting suitable or final data processing actions performable on the dataset, based on scores determined with respect to each of the data processing actions. One or more of the determined data processing actions may be respectively output in association with corresponding scores. The one or more determined data processing actions respectively output in association with the corresponding scores may include, for example, those having scores exceeding a predetermined threshold value.

Figure 2:
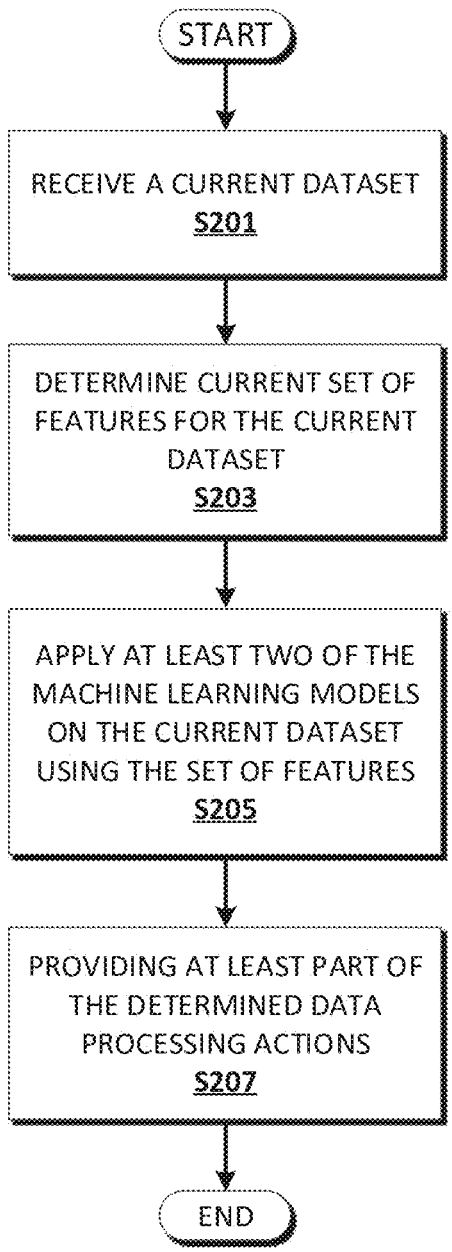
FIG. 2 is a flowchart depicting operational steps of an aspect of providing recommendations about processing datasets, in accordance with an embodiment of the present invention.

FIG. 2 is a flowchart depicting operational steps of an aspect of providing recommendations about processing datasets, in accordance with an embodiment of the present invention. The recommendations, suggestions, or the like, may include recommended or suggested data processing actions that may be performed with respect to corresponding datasets. The recommended data processing actions may be output, for example, in association with a score indicative of a corresponding level of confidence.

In various embodiments, data processing actions applied to datasets may comprise, for example, actions such as those relating to: data standardization, for application of certain standardization rules to affect standardized data representation of the datasets with respect to associated portions thereof, such as columns, rows, or the like; data masking, for obfuscation of certain data and information; row deduplication, for identification and merge of redundant data such as that relating to multiple records representing the same entity; data filtering, for removal of particular portions of the datasets, such as with respect to particular rows or particular columns of respective datasets; data enrichment, for joining related datasets such as to provide additional information; data transformation, for transforming one or more columns of respective datasets to a standardized or compatible format, such as by way of lookup codes, concatenation of data and information from disparate columns, or the like; and replacement of missing or incorrect values. Various extract, transform, load (ETL) data processing techniques may be applied in the data transformation of a dataset.

As used herein, "data standardization" or simply "standardization," refers to a process of transforming data to a predefined data format. The data format may include, for example, a common data definition, format, representation, model, structure, or the like. Transformed data may include non-conforming data, with respect to the predefined data format. For example, transforming the data may comprise processing the data to automatically transform the data where necessary, in order to ensure compliance of the data with common data representations that may be defined by the data format. The process of transforming data may include, for example, identifying and correcting invalid values, standardizing spelling formats and abbreviations, validating the format and content of the data, and the like.

At step S201, a current dataset may be received.

At step S203, a current set of features may be determined for the current dataset. In an example, step S203 may comprise, for example, determining the current set of features for the current dataset based on features such as input features required for respective input to each machine learning model of machine learning application 177. In another example, determining the current set of features for the current dataset may comprise receiving a selection of machine learning models of machine learning application 177, and determining which features may be required as input to each machine learning model of the selection of machine learning models.

Input features that may be used with machine learning models of machine learning application 177 may include, for example, terms and classifications of a dataset, terms and classifications associated with each field of the dataset, an origin of the dataset (e.g., a data lineage of the dataset to a corresponding source), data profiling results of the dataset or of each field of the dataset, such as with respect to inferred data type, data format, cardinality, min/max values, number of nulls/missing values, etc., data quality analyses results such as with respect to data rule violations, duplicate data entries such as in the form of duplicate rows or columns, etc., and processing data of the dataset using at least one of data profiling, data classification, and data quality algorithms.

Determining current features of a current dataset may be performed, for example, using one or more data profiling algorithms, data classification algorithms, and/or data quality algorithms. In an example, a data standardization rule used for US post addresses may be applied to a dataset where it has been detected that the dataset contains fields corresponding to a relevant or related domain. In the example, the data standardization rule used for the US post addresses may also be applied to the dataset where data profiling results indicate that standardization may be beneficial or necessary. In the example, input features for data standardization actions may thus include the data profiling results and field names or identifiers of the dataset.

At step S205, at least two machine learning models of machine learning application 177 may be applied on the current dataset, using the determined current features as input features to the at least two machine learning models. The machine learning models may be applied on the current dataset to determine respective data processing actions that may be performed on the current dataset. Each determined data processing action may be provided, for example, in association with a score indicative of a level of confidence of the determination of the action and a level of confidence of the respective machine learning model that made the determination.

At step S207, at least part of the determined data processing actions may be provided. In an example, the determined data processing actions may be provided by way of presentation to a user. In the example, the user may select part or all of the provided data processing actions to be performed in processing the current dataset.

In an example, where each machine learning model outputs a data processing action in association with a score, step S207 may comprise initially selecting data processing actions associated with scores exceeding a predetermined threshold value; and subsequently selecting, from among the initially selected data processing actions, data processing actions commonly output by machine learning models. In the example, the subsequently selected data processing actions may be provided to the user.

Figure 3:
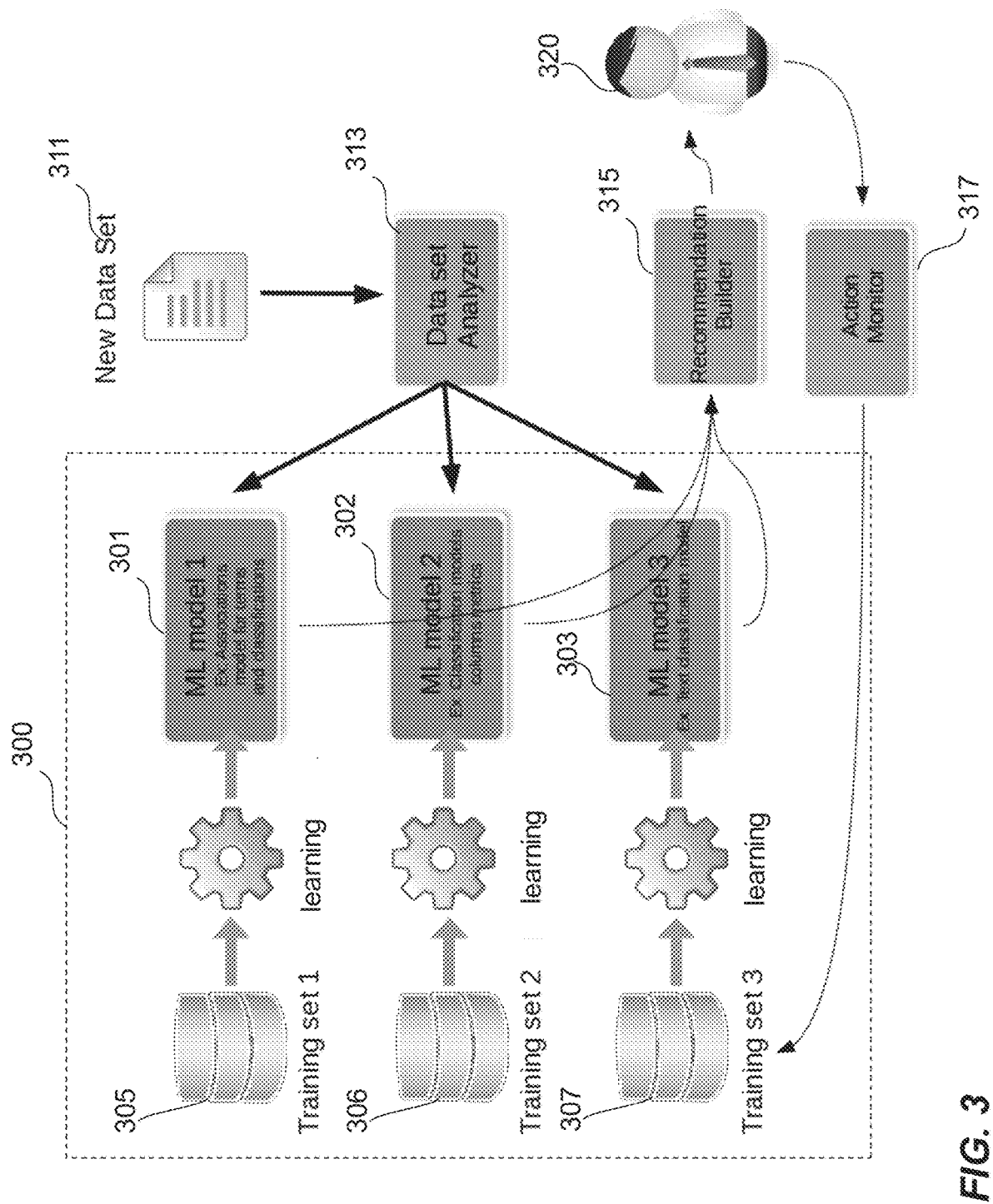
FIG. 3 is a block diagram depicting an example implementation of an aspect of providing recommendations about processing datasets, in accordance with an embodiment of the present invention.

FIG. 3 is a block diagram depicting an example implementation of an aspect of providing recommendations about processing datasets, in accordance with an embodiment of the present invention.

A problem associated with using a machine learning approach to process data such as datasets in accordance with embodiments of the present invention results from various limitations of individual machine learning algorithms in respectively handling various types of the data, such as that which may be of a data model, or the like. As depicted in FIG. 3, multiple machine learning models, such as machine learning models 301, 302, and 303, corresponding to machine learning models 1, 2, and 3, respectively, may be used in parallel to provide a solution to the problem. Machine learning model 301 may be, for example, an association model, machine learning model 302 may be, for example, a classification model, and machine learning model 303 may be, for example, a text classification model.

In an example, a list of terms and column classifications associated with a dataset, or with fields of the dataset, may form features required for input to a first machine learning model, such as machine learning model 301, in determining a corresponding data processing action to recommend with respect to the dataset, as the features may define a domain of the dataset. However, the list of terms and column classifications forming the features alone may not be sufficient for determining other types of data processing actions to recommend with respect to the dataset, such as those which may be based on other data content of the dataset. For example, data profiling results obtained for each field of the dataset may form features for input which provide an indication as to a state of data in the dataset, allowing for corresponding types of data processing actions to be determined for recommendation with respect to the dataset. The data profiling results for each data field may be, for example, composed by a fixed number of metrics and properties represented by values, or the like, computed for each data field. The data profiling results may form features for input to a second machine learning model, such as machine learning model 302, for determining another corresponding data processing action to recommend with respect to the dataset.

Terms and column classifications associated with datasets, or with fields of the datasets, forming features usable for input to, for example, machine learning model 301, may not be compatible with machine learning model 302, as a number of terms and column classifications of the datasets may vary as a function of a number of the fields of the datasets, respectively, from dataset to dataset. Terms and column classifications associated with datasets, or with fields of the datasets, may take the form of, for example, a corresponding list. As machine learning model 301 may be or may utilize an association model using or formed of one or more association algorithms, a list of terms and column classifications associated with a dataset forming features usable for input may readily be processed thereby. Machine learning model 301 may receive training data, or the like, such as training set 305, as depicted in FIG. 3. Training set 305 may include, for example, lists of terms and column classifications associated with datasets, and/or with fields of the datasets, such as in the form: [Dataset Term=CUSTOMER]+[Data Field Term=NAME]+[Data Field Term=ADDRESS]+[Data Field Term=PHONE]+[ . . . ]. Training set 305 may further include, for example, data and information such as in the form of a list of past actions taken by users with respect to the datasets. Machine learning model 301 may generate an association model based on training set 305, for use in determining corresponding data processing actions to recommend. The association model may be used to predict rules such as in the form: [Data Field Term=NAME]+[Data Field Term=ADDRESS]=>[Apply standardization rule PostAddress]. The predicted rules, and the like, may include, for example, corresponding levels of confidence, as previously described. For example, machine learning model 301 may determine that a standardization-type data processing action should be applied on a field such as "address," of a dataset.

Values representing data and information contained in fields of a dataset may form features for input to machine learning model 303. As machine learning model 303 may be or may utilize a text classification model using one or more text classification algorithms, values representing data and information contained in fields of a dataset forming features usable for input may readily be processed thereby. For example, the dataset may be preprocessed by concatenating all values of all fields of the dataset into a single text document, for input to machine learning model 303.

Sub-diagram 300 may comprise elements required for training and preparing each machine learning model 301, 302, and 303, respectively, for use. As depicted in FIG. 3, each machine learning model 301, 302, and 303, may be trained by way of training sets 305, 306, and 307, respectively. Training sets 305, 306, and 307, may comprise features required for input to machine learning model 301, 302, and 303, respectively, as well as data and information representing past actions taken by users with respect to corresponding datasets.

A particular workflow may occur when a new dataset such as dataset 311 is received for processing, as depicted in FIG. 3. In an example, dataset 311 may require preprocessing. In the example, dataset analyzer 313 may first apply data profiling algorithms, data classification, and data quality algorithms to dataset 311, to prepare data thereof for input to machine learning model 301, 302, and 303, respectively. The prepared data of dataset 311 may form metrics and properties (i.e., data forming the input features), and the like. In the example, dataset analyzer 313 may prepare a list of terms and column classifications associated with dataset 311, and with fields of dataset 311, for input to an association model such as machine learning model 301. In the example, dataset analyzer 313 may determine metrics and properties for each of the fields of dataset 311, for input to a classification model such as machine learning model 302. In the example, dataset analyzer 313 may concatenate values of the fields of dataset 311, for input to a text classification model such as machine learning model 303.

Features of datasets prepared by dataset analyzer 313 for input to machine learning model 301, 302, and 303, respectively, may enable predictive determination of corresponding data processing actions thereby, respectively, as depicted in FIG. 3. Each machine learning model 301, 302, and 303 may determine and provide the data processing actions, each respectively output in association with levels of confidence of the determinations, and levels of confidence of the respective machine learning model that made the determinations, accordingly. The levels of confidence may take the form of, for example, scores, as previously described.

Outputs by each machine learning model 301, 302, and 303, respectively, may be consolidated by recommendation builder 315 for generation of potential data preparation/cleansing steps performable on dataset 311, and for presentation to user 320, as depicted in FIG. 3. The outputs may include determined data processing actions associated with levels of confidence of the determinations, respectively, and levels of confidence of the respective machine learning model that made the determinations, accordingly. Recommendation builder 315 may be or may include a classification function for receiving as input classification results by machine learning model 301, 302, and 303, to generate and output consolidated classification results. In an example, recommendation builder 315 may implement a mathematical formula of an algorithm, or the like, to average or sum levels of confidence associated with determined data processing actions, as output by each machine learning model 301, 302, and 303, respectively. In the example, the mathematical formula may be used by recommendation builder 315 in averaging the levels of confidence associated with a particular determined data processing action, or in identifying a maximum level of confidence of the levels of confidence associated with the particular determined data processing action, as output by each machine learning model 301, 302, and 303, respectively. The averaged or maximum level of confidence may be used, for example, in determining whether to apply the particular determined data processing action.

User 320 may selectively affect one or more provided data processing actions, or otherwise affect one or more other data processing actions, for execution with respect to dataset 311. Upon processing of dataset 311, action monitor 317 may, for example, capture and log the actions selected or otherwise affected, for use in both: updating training sets 305, 306, or 307, and retraining machine learning models 301, 302, or 303, accordingly. The updating, the retraining, or both, may be, for example, set to occur at regular time intervals, respectively. The updating, the retraining, or both, may alternatively or otherwise be, for example, set to occur automatically.

In an example, a first machine learning model such as machine learning model 301 may be or include an association algorithm. The first machine learning model may require input training data (e.g., a training set) formed of, for example, a list of transactions each having at least 2 items. The input training data, such as received by the first machine learning model, may define data processing actions to be learned in training, based on data representing each transaction. Each transaction may be, for example, formed of a list of data processing actions, such as associative data processing actions, corresponding to, associated with, and performable with respect to each item of each transaction of the received input training data. The input training data received by the first machine learning model may be used in training the first machine learning model to determine and output (i.e., provide) similar data processing actions performable with respect to new or other received input data, such as that bearing resemblance or similarity to the received input training data.

An output produced by the first machine learning model may be determined and provided based on various aspects or features of the received input training data. For instance, the output by the first machine learning model may be a list of actions such as: {"item1"=>"item2"}, {"item3"+"item4"=>"item5"}, and so on. In other words, the output by the first machine learning model may include associations between items, objects, or the like, and tasks, actions, or the like, such as in the form of associations made between "item1" with respect to "item2," "item3" and "item4" with respect to "item5," and so on.

In the example, the first machine learning model may receive, such as during use, a dataset having another list of transactions. The list of transactions may be formed, for example, with respect to data processing actions performed on the dataset, as well as with respect to respective classifications, or definitions, of each column of the dataset. For instance, where the dataset includes 10 columns, each respectively defined by a data classifier such as: ID, first name, last name, phone number, address, city, zip, country, email address, and date of birth; and further, where 3 data cleansing actions were performed on the dataset, such as in the form: "run standardization on address," "run validation on email address," and "run deduplication on the dataset," a corresponding input transaction to the first machine learning model for the dataset may be, or may otherwise take the form: {"col=ID", "col=first name," "col=last name," "col=phone number," "col=address," "col=city," "col=zip," "col=country," "col=email address," "col=date of birth," "task=standardize address," "task=validate email," and "task=deduplicate"}. The training data, such as the training data used in training the first machine learning model, may include many such transactions.

In the example, the first machine learning model may produce outputs, such as: {"col=address"=>"task=standardize address" (80% confidence)}, {"col=email address"=>"task=validate email" (75% confidence)}, {"col=first name"+"col=" "last name"=>"task=deduplicate" (60% confidence)}, and so on. In other words, the outputs produced by the first machine learning model may indicate a task or action (e.g., a data processing action) to be performed on a dataset, with respect to a corresponding item, such as of a column, a field (i.e., data field), or the like, of the dataset. The outputs may or may not be respectively associated with levels of confidence, as previously described. For instance, a data processing action to be performed, consisting of a standardization of one or more address fields, may be output in association with a level of confidence of 80%. The outputs may, for example, be provided as rules.

In the example, where the first machine learning model receives an input dataset having columns classified, for example, in terms of: {"phone number," "address," "email address," "product reference," and "quantity"}, an output by the first machine learning model may likely include data processing actions performable on the input dataset, such as a data cleansing actions including cleansing steps such as {"standardize address" (80% confidence)}, and {"validate email" (75% confidence)}, in accordance with the training data used in training the first machine learning model. In the example, a data deduplicate action, being associated with a 0% level of confidence due to a lack of columns of the input dataset being classified in terms of "first name" and "last name," may be omitted from the provided data processing actions.

In another example, a second machine learning model such as machine learning model 302 may be or include a classification algorithm. The second machine learning model may require input training data (e.g., a training set) formed of, for example, a set of items or objects (e.g., data objects), each respectively corresponding to one or more categories, features, attributes, or the like. The items may be of fields (i.e., data fields) of the received input training data. The input training data received by the second machine learning model may define data processing actions to be learned in training, based on data representing each item of the set of items and each corresponding category (e.g., categorical field) thereof. Further, the input training data may enable the second machine learning model to receive as input a set of attributes, to provide a prediction of a corresponding categorical field, or the like, as an output. The input training data received by the second machine learning model may be used in training the second machine learning model to determine and output (i.e., predict) similar data processing actions performable with respect to new or other received input data, such as that bearing resemblance or similarity to the received input training data.

An input dataset to the second machine learning model may be formed of features of the input dataset, such as:

{number of columns=10}, {number of rows=100,000}, {source of the data=ORDER.CUSTOMERS}, {incomplete rows=5%}, {violations data quality rule=10%}, and {cleansing task=Apply ETL job CleanseCustomer}. If, in addition to the cleansing task: "{cleansing task=Apply ETL job CleanseCustomer}," a deduplication task were to be applied to the input dataset, a second record with similar features as described above, but having a different task (e.g., cleansing task) to be performed, may be generated. For instance: {number of columns=10}, {number of rows=100,000}, {source of the data=ORDER.CUSTOMERS}, {incomplete rows=5%}, {violations data quality rule=10%}, and {cleansing task="Deduplicate"}. The input training data to the second machine learning model may include many such items or objects and respective sets of attributes thereof, such as the aforementioned records. Further, respective records of the input training data to the second machine learning model may be associated with respective data processing actions, such as the cleansing tasks, or the like. During use, the second machine learning model may receive an input dataset having features such as: {number of columns=15}, {number of rows=50,000}, {source of the data=ORDER.PRODUCT}, {incomplete rows=5%}, and {violations data quality rule=25%}. In response, the second machine learning model may produce outputs including, for example, one or more determined data processing actions in association with corresponding levels of confidence, as previously described.

In yet another example, a computer implemented method for making recommendations about processing datasets, each dataset having records containing a respective set of data fields. The method comprises: providing a set of machine learning models, each machine learning model taking or implementing a respective set of metrics and properties of a dataset as an input and determining a recommendation for processing the dataset based on the respective set of metrics and properties; receiving a current dataset; determining a current set of metrics and properties for the current dataset as a whole and for its data fields; applying at least two of the machine learning models on the current dataset, resulting in at least two recommendations for processing the current dataset; combining the at least two recommendations into a final recommendation by using a classification function; presenting the final recommendation to a user or otherwise processing the current dataset based on the final recommendation. A recommendation may for example comprise a set of actions, each action list having a level of confidence of the prediction.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for providing recommendations about processing datasets, each dataset comprising records containing a respective set of data fields, the method comprising:
receiving, by a processor, a current dataset;
determining, by the processor, a set of features of the current dataset;
creating, by the processor, a set of data processing actions based on the set of features of the current dataset, each data processing action in the set of data processing actions being output from a corresponding machine learning model in a provided set of machine learning models, and wherein each data processing action is associated with a confidence score and is selected from a group consisting of: data standardization, data masking, row deduplication, data filtering, data enrichment, data transformation and replacement of missing or incorrect values;
generating, by the processor, one or more recommended data processing actions based on the set of data processing actions and the associated confidence scores;
performing, by the processor, one or more data processing actions in the set of data processing actions on the current dataset;
determining, by the processor, a prior data processing action that was previously performed on the current dataset;
updating, by the processor, training data used in training the machine learning model based on the prior data processing action that was previously performed on the current dataset; and
retraining, by the processor, the machine learning model using the updated training data.

2. The method of claim 1, wherein the confidence score indicates a relevance of an associated data processing action.

3. The method of claim 2, wherein the confidence score indicates one or more of: a level of confidence of a determination of an associated data processing action, and a level of confidence of the machine learning model.

4. The method of claim 2, wherein the performing the one or more data processing actions in the set of data processing actions on the current dataset further comprises:
selecting, by the processor, the recommended data processing actions, based on the associated confidence score; and
performing, by the processor, the recommended data processing action on the current dataset.

5. The method of claim 1, wherein the performing the one or more data processing actions in the set of data processing actions on the current dataset further comprises:
displaying, by the processor, the one or more data processing actions in the set of data processing actions to a user for selection; and
performing, by the processor, the one or more data processing actions in the set of data processing actions that are selected by the user on the current dataset.

6. The method of claim 1, wherein the performing the one or more data processing actions in the set of data processing actions on the current dataset further comprises:
receiving, by the processor, a selection of one or more data processing actions in the set of data processing actions; and
performing, by the processor, the selection of the one or more data processing actions in the set of data processing actions on the current dataset.

7. The method of claim 1, wherein the set of features of the current dataset are determined using one or more of: data profiling algorithms, data classification algorithms, and data quality algorithms.

8. The method of claim 1, further comprising:
determining a quality metric of the current dataset after performance of the one or more data processing actions in the set of data processing actions; and
retraining the machine learning model using the determined quality metric.

9. The method of claim 1, wherein the machine learning model comprises one or more of: an association model for associating terms with classifications, a classification model, and a text classification model.

10. A computer system for providing recommendations about processing datasets, the computer system comprising:
one or more computer processors, one or more computer-readable storage media, and program instructions stored on the one or more of the computer-readable storage media for execution by at least one of the one or more computer processors, the program instructions, when executed by at least one of the one or more computer processors, causing the computer system to perform a method comprising:

receiving a current dataset;

determining a set of features of the current dataset;

creating a set of data processing actions based on the set of features of the current dataset, each data processing action in the set of data processing actions being output from a corresponding machine learning model in a provided set of machine learning models, and wherein each data processing action is associated with a confidence score and is selected from a group consisting of: data standardization, data masking, row deduplication, data filtering, data enrichment, data transformation and replacement of missing or incorrect values;

generating, one or more recommended data processing actions based on the set of data processing actions and the associated confidence scores;

performing one or more data processing actions in the set of data processing actions on the current dataset;

determining a prior data processing action that was previously performed on the current dataset;

updating training data used in training the machine learning model based on the prior data processing action that was previously performed on the current dataset; and retraining the machine learning model using the updated training data.

11. The computer system of claim 10, wherein the confidence score indicates a relevance of an associated data processing action.

12. The computer system of claim 11, wherein the confidence score indicates one or more of: a level of confidence of a determination of an associated data processing action, and a level of confidence of the machine learning model.

13. The computer system of claim 11, wherein the performing the one or more data processing actions in the set of data processing actions on the current dataset further comprises:

selecting the recommended data processing actions, based on the associated confidence score; and performing, by the processor, the recommended data processing action on the current dataset.

14. A computer program product for providing recommendations about processing datasets, comprising:

one or more computer-readable storage devices and program instructions stored on at least one of the one or more computer-readable storage devices for execution by at least one or more computer processors of a computer system, the program instructions, when executed by at least one of the one or more computer processors, causing the computer system to perform a method comprising:

receiving a current dataset;

determining a set of features of the current dataset;

creating a set of data processing actions based on the set of features of the current dataset, each data processing action in the set of data processing actions being output from a corresponding machine learning model in a provided set of machine learning models, and wherein each data processing action is associated with a confidence score and is selected from a group consisting of: data standardization, data masking, row deduplication, data filtering, data enrichment, data transformation and replacement of missing or incorrect values;

generating, one or more recommended data processing actions based on the set of data processing actions and the associated confidence scores;

performing one or more data processing actions in the set of data processing actions on the current dataset;

determining a prior data processing action that was previously performed on the current dataset;

updating training data used in training the machine learning model based on the prior data processing action that was previously performed on the current dataset; and retraining the machine learning model using the updated training data.

15. The computer program product of claim 14, wherein the confidence score indicates a relevance of an associated data processing action.

16. The computer program product of claim 15, wherein the confidence score indicates one or more of: a level of confidence of a determination of an associated data processing action, and a level of confidence of the machine learning model.

17. The computer program product of claim 15, wherein the performing the one or more data processing actions in the set of data processing actions on the current dataset further comprises:

selecting the recommended data processing actions, based on the associated confidence score; and performing, by the processor, the recommended data processing action on the current dataset.

* * * * *